US012003446B2

(12) United States Patent
Abotabl et al.

(10) Patent No.: US 12,003,446 B2
(45) Date of Patent: Jun. 4, 2024

(54) DYNAMIC NETWORK POWER MODE SWITCHING AND TIMELINE

(71) Applicant: QUALCOMM Incorporated, San Diego, CA (US)

(72) Inventors: Ahmed Attia Abotabl, San Diego, CA (US); Hung Dinh Ly, San Diego, CA (US); Yongjun Kwak, San Diego, CA (US); Yuchul Kim, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 17/451,146

(22) Filed: Oct. 15, 2021

(65) Prior Publication Data

US 2023/0116936 A1    Apr. 20, 2023

(51) Int. Cl.
*H04L 5/00* (2006.01)
*H04W 36/00* (2009.01)
(Continued)

(52) U.S. Cl.
CPC .......... *H04L 5/0048* (2013.01); *H04L 5/0098* (2013.01); *H04W 36/0072* (2013.01);
(Continued)

(58) Field of Classification Search
CPC ....... H04L 5/003; H04L 5/0048; H04L 5/005; H04L 5/0051; H04L 5/0096; H04L 5/0098; H04L 8/0833; H04W 72/044; H04W 72/0473; H04W 72/04; H04W 72/042; H04W 36/0072; H04W 36/0096; H04W 52/30; H04W 52/34; H04W 52/00; H04W 52/04; H04W 52/06; H04W 52/10; H04W 52/386
See application file for complete search history.

(56) References Cited

U.S. PATENT DOCUMENTS 8,204,535 B1 *   6/2012   Shetty ................. H04W 52/386
                                                                455/220
11,864,125 B2 *   1/2024   Zhou ...................... H04W 52/24
(Continued)

FOREIGN PATENT DOCUMENTS

WO        WO 0108322       *   2/2001   ............. H04B 7/005

OTHER PUBLICATIONS

International Search Report and Written Opinion—PCT/US2022/046324—ISA/EPO—dated Feb. 2, 2023.

*Primary Examiner* — Warner Wong
(74) *Attorney, Agent, or Firm* — Procopio, Cory, Hargreaves & Savitch LLP

(57) ABSTRACT

A user equipment (UE) receives, from a base station, a network power mode configuration and receive control signaling indicating for the UE to switch to the network power mode configuration. The UE communicates with the base station based on the network power mode configuration in response to the control signaling. A base station transmits, to a UE, a network power mode configuration, and transmits control signaling indicating for the UE to switch to the network power mode configuration. The base station communicates with the UE based on the network power mode configuration in response to the control signaling.

30 Claims, 10 Drawing Sheets

(51) Int. Cl.
*H04W 52/34* (2009.01)
*H04W 72/044* (2023.01)
*H04W 72/23* (2023.01)
*H04W 52/38* (2009.01)

(52) U.S. Cl.
CPC ....... *H04W 52/34* (2013.01); *H04W 72/0473* (2013.01); *H04W 72/23* (2023.01); *H04W 52/386* (2013.01)

(56) References Cited

U.S. PATENT DOCUMENTS

| | | | |
|---|---|---|---|
| 2010/0002614 A1* | 1/2010 | Subrahmanya | H04W 88/08 370/311 |
| 2011/0002253 A1* | 1/2011 | Cha | H04W 52/0235 370/311 |
| 2013/0115998 A1* | 5/2013 | Lamm | H04W 52/60 455/522 |
| 2013/0294303 A1* | 11/2013 | Vyas | H04W 76/28 370/311 |
| 2016/0323887 A1* | 11/2016 | Patel | H04W 52/146 |
| 2017/0126461 A1* | 5/2017 | Li | H04L 5/0096 |
| 2017/0187595 A1* | 6/2017 | Tinnakornsrisuphap | H04W 52/0235 |
| 2019/0222348 A1* | 7/2019 | Zhang | H04W 52/0235 |
| 2019/0281545 A1* | 9/2019 | Kim | H04W 52/0216 |
| 2020/0221390 A1 | 7/2020 | Xu et al. | |
| 2020/0260376 A1* | 8/2020 | Islam | H04W 52/0212 |
| 2020/0267652 A1* | 8/2020 | Choi | H04L 1/1819 |
| 2021/0029646 A1 | 1/2021 | Park | |
| 2022/0240188 A1* | 7/2022 | Tokuyama | H04W 52/0277 |
| 2022/0386243 A1* | 12/2022 | Liang | H04W 52/226 |
| 2023/0105748 A1* | 4/2023 | Abedini | H04W 52/325 370/318 |
| 2023/0209463 A1* | 6/2023 | Shih | H04W 52/0216 370/311 |
| 2023/0319830 A1* | 10/2023 | Liang | H04L 5/005 370/329 |

* cited by examiner

DYNAMIC NETWORK POWER MODE SWITCHING AND TIMELINE

TECHNICAL FIELD

The present disclosure relates generally to communication systems, and more particularly, to wireless communication including a network power mode.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives, from a base station, a network power mode configuration and receive control signaling indicating for the UE to switch to the network power mode configuration. The apparatus communicates with the base station based on the network power mode configuration in response to the control signaling.

In an aspect of the disclosure, a method, a computer-readable medium, and an apparatus are provided for wireless communication at a base station. The apparatus transmits, to a UE, a network power mode configuration, and transmits control signaling indicating for the UE to switch to the network power mode configuration. The apparatus communicates with the UE based on the network power mode configuration in response to the control signaling.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
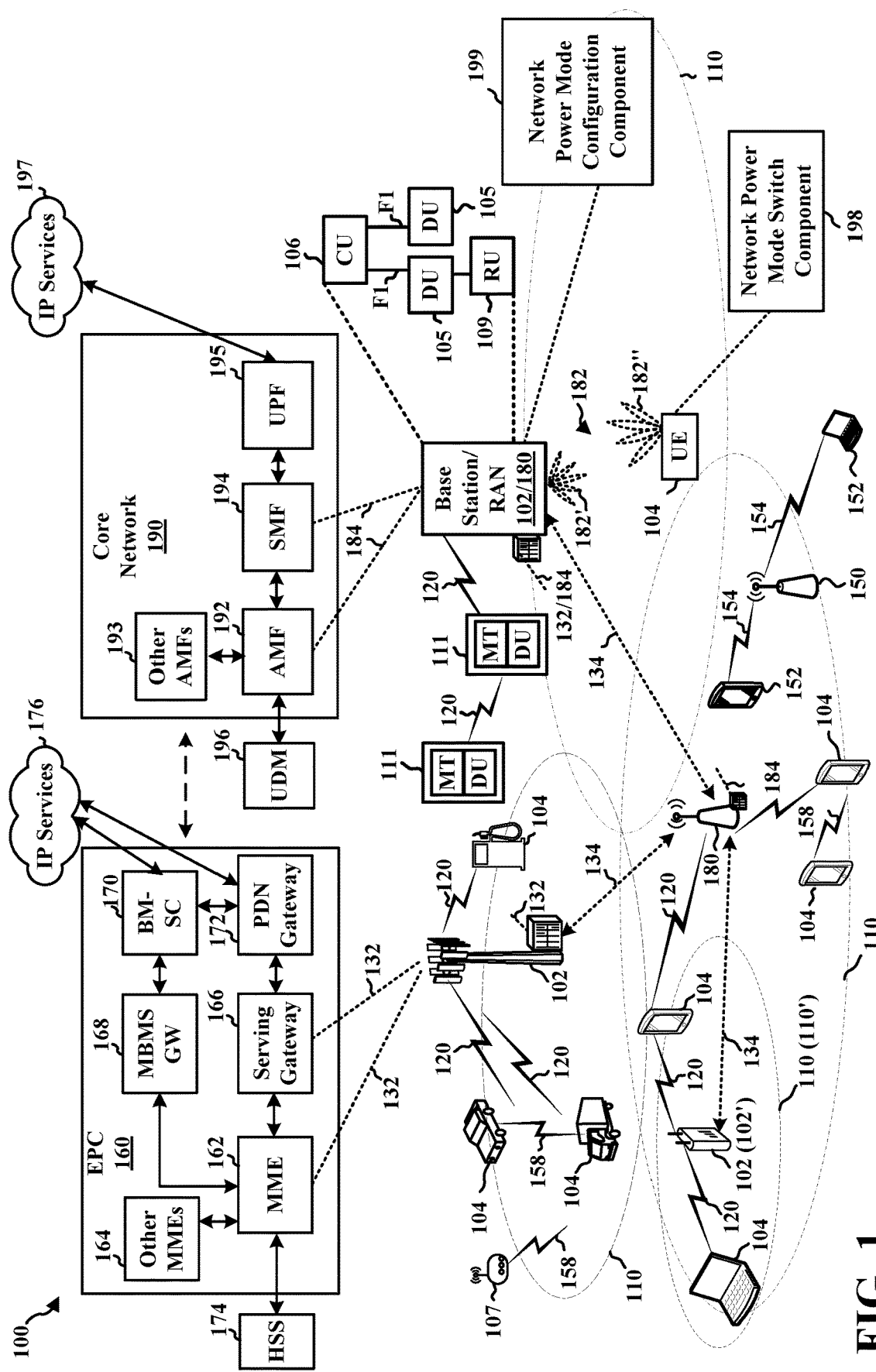
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6

GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a network power mode switch component 198 that is configured to receive, from a base station 102 or 180, a network power mode configuration and receive downlink control information (DCI) indicating for the UE to switch to the network power mode configuration. The network power mode switch component 198 is configured to communicate with the base station 102 or 180 based on one of the network power mode configuration in response to the DCI, e.g., and may be configured to change transmission and/or reception in response to a switch of a power mode configuration for the network. The base station 102 or 180 may include a network power mode configuration component 199 that is configured to transmit, to a UE 104, a network power mode configuration, and transmit DCI indicating for the UE to switch to the network power mode configuration. The base station communicates with the UE 104 based on the network power mode configuration in response to the DCI Although the following description may be focused on 5G NR, the concepts described herein may be applicable to other similar areas, such as LTE, LTE-A, CDMA, GSM, and other wireless technologies.

Figures 2A, 2B, 2C, 2D:
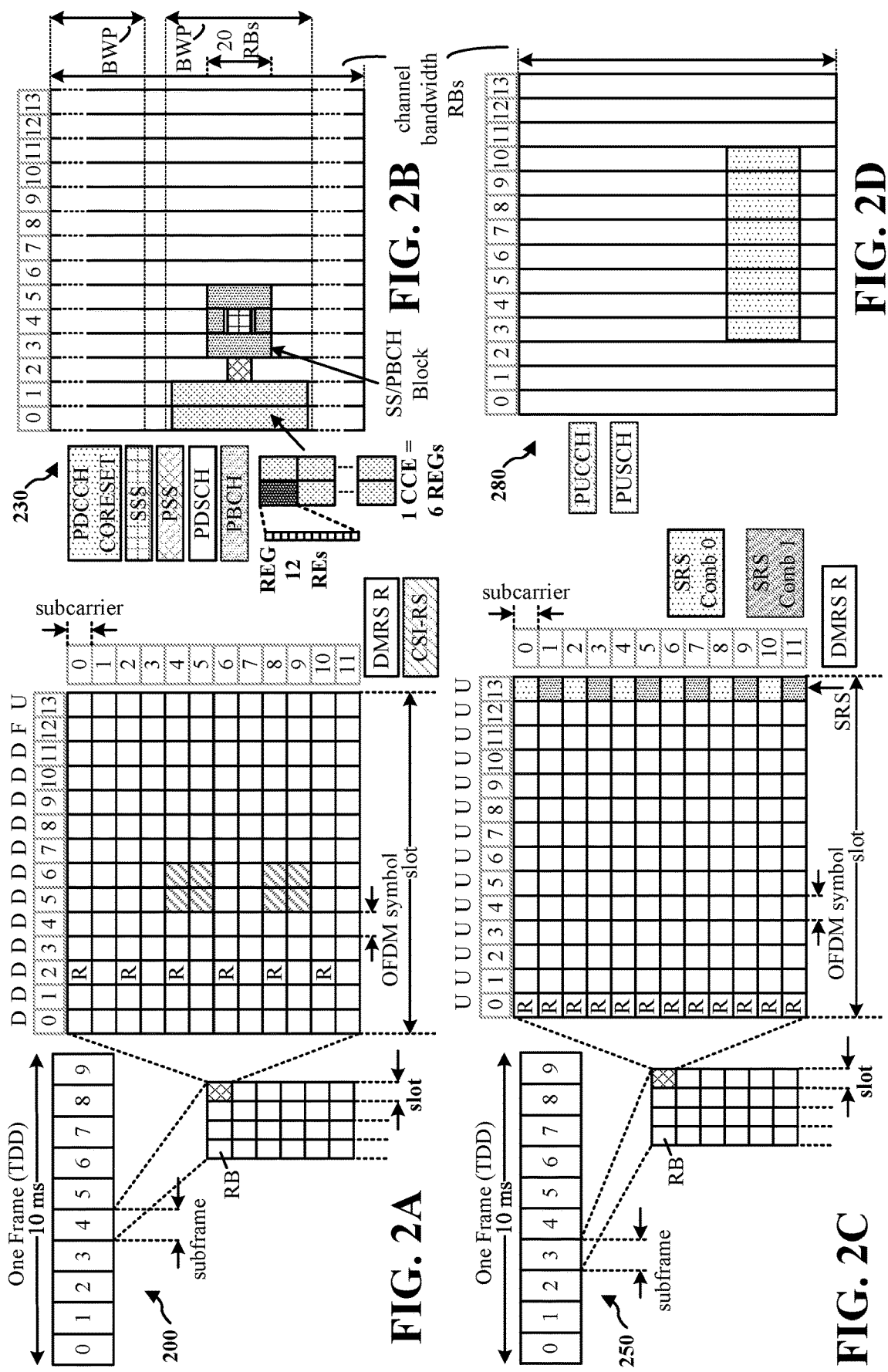
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
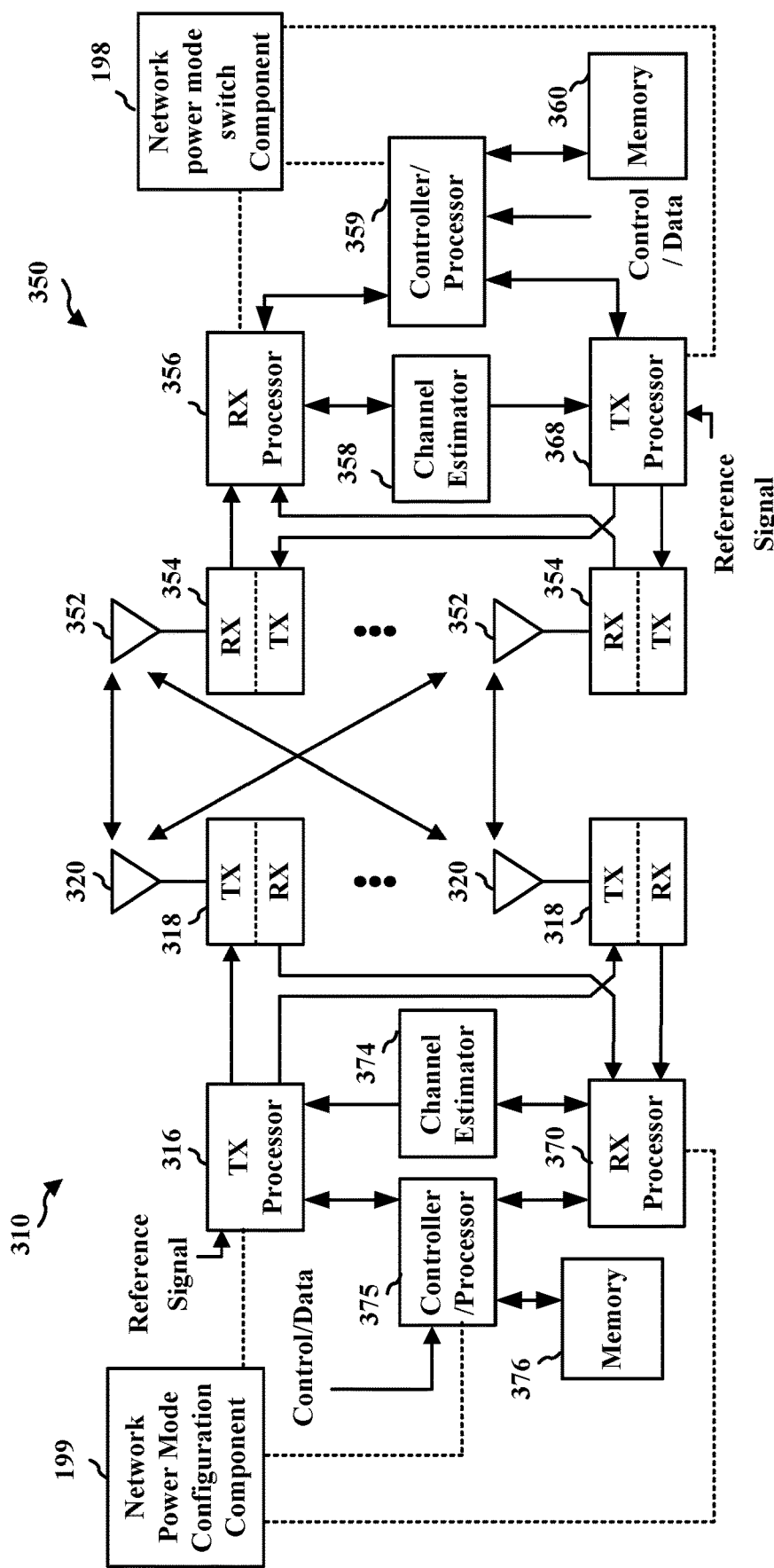
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the network power mode switch component 198 of FIG. 1.

At least one of the TX processor 316, the RX processor 370, and the controller/processor 375 may be configured to perform aspects in connection with the network power mode configuration component 199 of FIG. 1.

A network device may have different modes and different operations that enable the network to conserve power resources while maintaining network operation. A network power mode may refer to a mode of operation of the base station, the mode being based on any combination of parameters that affect the power consumption of the base station, such as a number of active antennas, a bandwidth, a transmission power, a number of active CCs, a number of layers, a number of inactive symbols in a slot, as well as other parameters. As an example, a base station (e.g., base station 102, 180, or 310) may reduce a number of active antennas (e.g., transmission and/or reception antennas) in one of the power modes to reduce power consumption.

As an example in a first power mode, the base station may transmit and receive communication using 128 antennas. In a second power mode, the base station may transmit and receive communication using a reduced set of antennas, such as 64 antennas. In a third power mode, the base station may transmit and receive communication using a further reduced set of antennas (e.g., 32 antennas). Table 1 illustrates an example of multiple network power mode configurations based on a number of antennas. The network power mode configurations may also include other parameters that different between modes, e.g., beyond the number of active antennas.

TABLE 1

| Network Power Mode | Configuration |
| --- | --- |
| Mode 1 | 128 active antennas |
| Mode 2 | 64 active antennas |
| Mode 3 | 32 active antennas |

As another example of a power mode, the base station may reduce transmission power in one or more power modes in order to conserve power. For example, in a first power mode, the base station may use a first transmission power for transmitting downlink communication. In a second power mode, the base station may transmit downlink communication using a reduced transmission power. Similar to the example for a power mode with a reduced set of antennas, the base station may have additional power modes with further reduced transmission power. Table 2 illustrates an example of multiple network power mode configurations based on transmission power. The network power mode configurations may also include other parameters that different between modes, e.g., beyond the transmission power.

TABLE 2

| Network Power Mode | Configuration |
| --- | --- |
| Mode 4 | Transmission Power A |
| Mode 5 | Transmission Power B (B < A) |
| Mode 6 | Transmission Power C (C < B) |

As another example of a power mode, the base station may operate based on a reduced bandwidth in one or more power modes in order to conserve power. For example, in a first power mode, the base station may use a first bandwidth communication with one or more UEs. In a second power mode, the base station may use a reduced bandwidth for communication with the one or more UEs. Similar to the example for a power mode with a reduced set of antennas, the base station may have additional power modes with further reduced bandwidth. Table 3 illustrates an example of multiple network power mode configurations based on a network bandwidth. The network power mode configurations may also include other parameters that different between modes, e.g., beyond the network bandwidth.

TABLE 3

| Network Power Mode | Configuration |
| --- | --- |
| Mode 7 | Bandwidth A |
| Mode 8 | Bandwidth B (B < A) |
| Mode 9 | Bandwidth C (C < B) |

As another example of a power mode, the base station may operate based on a reduced number of component carriers in one or more power modes in order to conserve power. For example, in a first power mode, the base station may provide, or use, a number of component carriers (CCs) for communication with one or more UEs. In a second power mode, the base station may provide, or use, a reduced number of CCs for communication with the one or more UEs. Similar to the example for a power mode with a reduced set of antennas, the base station may have additional power modes with further reduced numbers of CCs. Table 4 illustrates an example of multiple network power mode configurations based on a number of CCs. The network power mode configurations may also include other parameters that different between modes, e.g., beyond the number of CCs.

TABLE 4

| Network Power Mode | Configuration |
|---|---|
| Mode 10 | X CCs |
| Mode 11 | Y CCs (Y < X) |
| Mode 12 | Z CCs (Z < Y) |

Table 5 illustrates an example in which the network power mode configurations may include a combination of parameters to illustrate the concept. A network power mode configuration may include any combination of parameters that affect power consumption at the network, and is not limited to the examples in Tables 1-5.

TABLE 5

| Network Power Mode | Configuration |
|---|---|
| Mode 13 | 128 antennas, transmission power A, bandwidth A, and X CCs |
| Mode 14 | 128 antennas, transmission power A, bandwidth B, and Y CCs (Y < X) |
| Mode 15 | 64 antennas, transmission power A, bandwidth A, and Y CCs |
| Mode 15 | 64 antennas, transmission power C, bandwidth B, and Z CCs |

The examples illustrated in Tables 1-5 are merely to illustrate the concept of network power modes and network power mode configuration parameters. The concepts presented herein apply to additional examples of network power mode configurations.

The network may switch between the different power modes according to network input. The network may signal a change in power mode to a UE so that the can apply a corresponding configuration, or behavior, for communication with the network.

Figure 4:
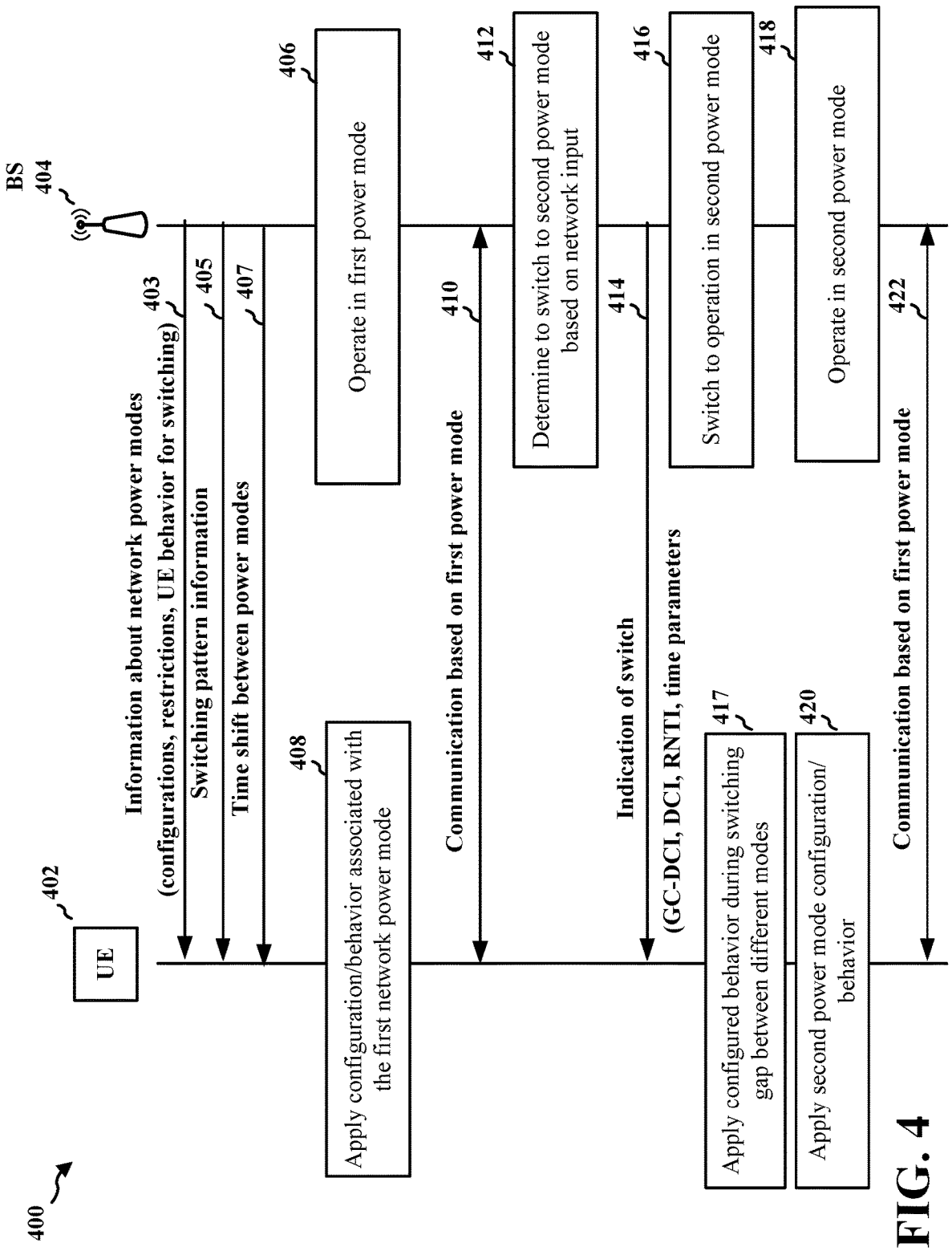
FIG. 4 is an example communication flow between a UE and a base station, in accordance with various aspects of the present disclosure.

FIG. 4 illustrates an example communication flow 400 between a UE 402 and a base station 404 that includes a switch between different network power mode configurations for the base station. At 406, the network operates in a first power mode, and applies the corresponding configuration. The first power mode may include any of the aspects described, e.g., in connection with Tables 1-5. For example, the first power mode configuration may have a particular number of active antennas, transmission power, bandwidth, number of CCs, etc. As illustrated at 408, the UE 402 may apply a corresponding configuration or behavior based on the first network power mode configuration used by the base station 404.

The UE 402 and the base station may transmit and receive communication 410 based on the network power mode configuration. As an example, the base station 404 may transmit a downlink transmission using an active antenna based on the first network power mode, a transmission power based on the first network power mode, a frequency resource based on the bandwidth of the first network power mode, or in a CC that is active in the first power mode, etc. The UE 402 may monitor for the downlink transmission from the active antenna according to the first power mode, based on a transmission power of the first power mode, at a frequency resource based on the bandwidth of the first power mode, in a CC that is active in the first power mode. In some aspects, the UE may adjust uplink transmission to the base station 404 based on the first power mode, e.g., based on the antenna(s) that the base station 404 will use for reception, within the bandwidth used by the base station 404 in the first power mode, or in a CC that is active in the first network power mode.

At 412, the network may determine to change to a different network power mode. The determination may be based on network input. The base station 404 may indicate, at 414, the switch to the UE 402 so that the UE will be aware that the network will switch between network power mode configurations.

The network may then switch to operation based on the second power mode configuration, at 416, and may operate in the second power mode at 418. For example, the second power mode configuration may have a different number of active antennas, a different transmission power, a different bandwidth, a different number of CCs, etc. than the first power mode configuration. As illustrated at 420, the UE 402 may apply a corresponding configuration or behavior based on the second network power mode configuration used by the base station 404.

The UE 402 and the base station may transmit and receive communication 422 based on the second network power mode configuration, e.g., as described in connection with 410 for the first power mode configuration.

Figure 5:
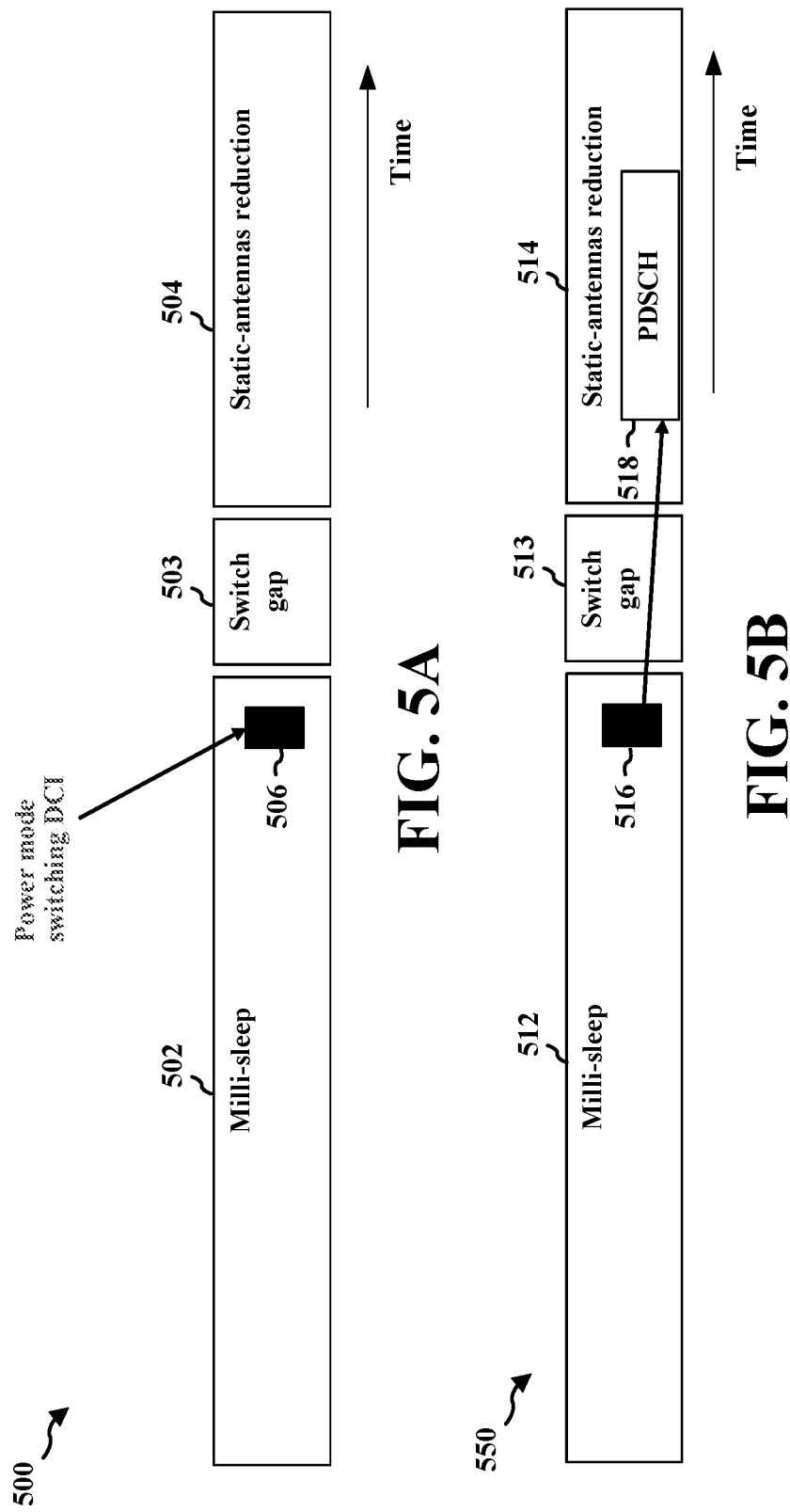
FIGS. 5A and 5B illustrate examples aspects of switching between communication based on different network power modes, in accordance with various aspects of the present disclosure.

The base station 404 may provide the indication, at 414, to the UE 402 that the base station will change between network power modes in various ways. In some aspects, the base station 404 may transmit DCI to the UE 402 indicating a new power mode that the base station will use. In some aspects, the DCI may be a group common DCI (GC-DCI) that indicates the change to multiple UEs. A GC-DCI may be a DCI that may be decoded in common by multiple UEs. In some aspects, the GC-DCI may have a radio network temporary identifier (RNTI) associated with the purpose of switching between network power modes. The DCI may be a DCI defined for, or dedicated to, network power mode switching indications, in some aspects. FIG. 5A illustrates an example time diagram 500 of a time period 502 during which the base station 404 operates in a first network power mode. In FIG. 5A, the example of the first network power mode is a milli-sleep mode (e.g., having one or more symbol of each slot as an inactive slot). During the first period of time 502, the base station transmits a power mode switching DCI 506 (e.g., similar to 414) indicating a switch to a second network power mode. The base station may operate based on the second network power mode in a time period 504, e.g., following a switching gap in time 503. In some aspects, the base station may configure the UE 402 with information about the different possible network power modes, at 403, and may provide the UE 402 with information about possible network power mode switching patterns, at 405. The information at 403 and 405 may be transmitted to the UE 402 in RRC signaling, for example. Although the example described in FIG. 5A, and similarly 5B, are described for DCI, the base station may also provide the indication that the network power mode will change to the UE in other messages, such as in a MAC-CE, or based on an RRC configuration. Therefore, the base station may provide the indication of a network power mode switch based on one or more of a DCI, a MAC-CE, or an RRC configuration.

In some aspects, a scheduling DCI may indicate a change in a network power mode. As an example, the scheduling DCI may indicate the power mode during which a PDSCH scheduled by the DCI will be transmitted. FIG. 5B illustrates an example 550 in which the base station indicates the switch to the UE in a scheduling DCI. In FIG. 5B, the base station is in a first network power mode during the first period of time 512, and the base station transmits a DCI 516 scheduling PDSCH resources 518 for a PDSCH transmission from the base station in a second time period 514. The DCI 516 may indicate a second network power mode. The indication of the second network power mode in the DCI may provide the indication (e.g., similar to 414) indicating a switch to a second network power mode. The base station may operate based on the second network power mode in a time period 514, e.g., following a switching gap in time 513. The UE may understand to apply the second network power mode during the time that the PDSCH is scheduled for transmission.

Figure 6:
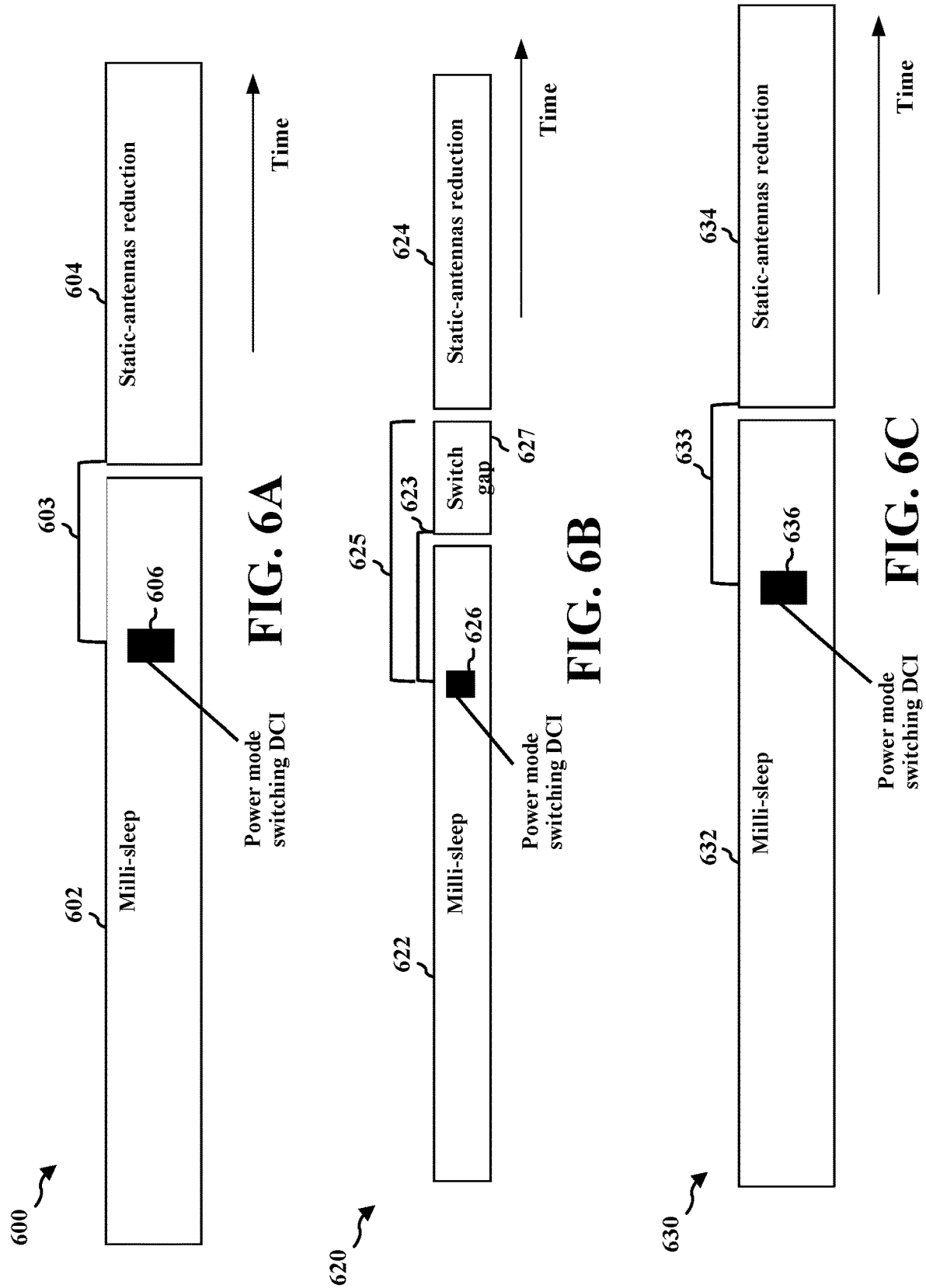
FIGS. 6A, 6B, and 6C illustrate timing diagrams showing example timeline aspects for switching between communication based on different network power modes, in accordance with various aspects of the present disclosure.

The base station 404 may provide the UE 402 with timeline information relating to switches between different network power modes for the base station. In some aspects, the base station 404 may configure the UE 402, e.g., at 407, with a time shift amount to apply between reception of the DCI scheduling the power mode switch and communicating based on the new network power mode. The base station 404 may indicate the size of the time shift to the UE in RRC signaling, for example. In some aspects, the base station 404 may configure multiple time shifts, or time delays, and the DCI (e.g., 414), may indicate one of the configured time shifts for the UE to apply between the first power mode and the second power mode. FIG. 6A illustrates an example 600 of a time shift, or time period, between the DCI and the application of the new network power mode. FIG. 6A illustrates operation in a first network power mode during time period 602. The base station transmits a DCI 606 indicating a switch to a second network power mode. A time period 603, which may be referred to as a time shift, may extend between the DCI 606 and the application of the second network power mode at time period 604. The base station may configure, or indicate, a duration of the time period 603 to the UE in RRC signaling. The RRC configuration may configure multiple values, and the DCI 606 may indicate one value for the time period 603. The UE 402 may begin communication with the base station 404 based on the second network power mode at a time following reception of the DCI 606 and the time period 603 elapsing. In some aspects, the DCI 606 may indicate the value of the time period 603, e.g., without reference to an RRC configure value. The length of the time period 603 may be a number of slots, a number of symbols, a number of frames, or a number of milli-seconds.

In some aspects, such as shown in the example 620 in FIG. 6B, the base station may dynamically indicate to the UE the time gap 623 between the indicating DCI and/or a switching time gap 625 for switching between power modes (e.g., between a first power mode during a first timer period 622 and a second power mode during a second time period 624). The DCI 626 may also indicate the length of the switching gap 627. The indication can be in terms of the time duration of the switching gap 627 itself or the time duration from the beginning of the DCI 626 to the end of the switching gap 627, e.g., as illustrated at 625. The UE may operate according to the current power mode, e.g., during the time period 622, until the time for the switching gap 627. Then, the UE may apply a UE behavior for a switching gap. As an example, the UE 402 may apply a configured behavior during the switching gap, at 417. The UE behavior may be specific to a switch between the two particular power modes or may be general to a switch between any two network power modes. Following the switching gap, the UE may operate according to the second network power mode. In some aspects, if the UE does not have downlink or uplink communication scheduled in the first time duration 622, the UE can start the behavior of the switching gap upon reception of the DCI 626 without waiting for the time period 623 to elapse.

Examples of UE behavior that the base station 404 may configure for the UE 402 to apply when switching between network power modes include delaying any uplink transmissions with a delay interval, cancelling and uplink grants, cancelling dynamically configured uplink grants (while retaining configured grants or semi-static or periodic uplink grants), canceling configured grant transmissions (while retaining dynamic uplink grant transmissions), canceling channel measurement reporting, etc. The delay interval for delaying uplink transmissions may be given by a number of symbols, a number of slots, a number of frames, or a number of milliseconds.

In some aspects, the DCI may reference RRC configurations with different switching time configurations, not in terms of time but in terms of UE behavior. The DCI may indicate for the UE to apply a particular behavior before transitioning to operation based on the second power mode. FIG. 6C illustrates an example 630 in which the DCI 636 may indicate a UE behavior, e.g., from one or more UE behaviors that may have been previously configured in RRC signaling, for the UE to apply in connection with the switch between network power modes. The UE may operate according to the current power mode, e.g., during the time period 632, until the time period 633 between the DCI 636 indicating the power mode switch, and the beginning of operation based on the second network power mode at 634. The UE may apply a UE behavior indicated by the DCI during the period 633, prior to the switch at the beginning of 634, and/or in connection with the switch beginning at 634. In some aspects, the behavior may indicate, or lead to, the length of time 633. As an example, the base station may indicate (e.g., in RRC configuration and/or in the DCI) for the UE to finish transmission or reception of any previously scheduled downlink or uplink transmissions, including their corresponding HARQ-ACK, before switching to the new power mode. The UE can be RRC configured with a set of conditions for switching, and the DCI may indicate the particular condition to be satisfied before the switching, e.g., before beginning the operation based on the second network power mode, at 634.

Although the examples described in FIGS. 6A, 6B, and 6B for the indication of the switch in DCI, in some aspects, the base station may indicate the change of a network power mode to the UE in one or more of DCI, a MAC-CE, or an RRC configuration.

Figure 7:
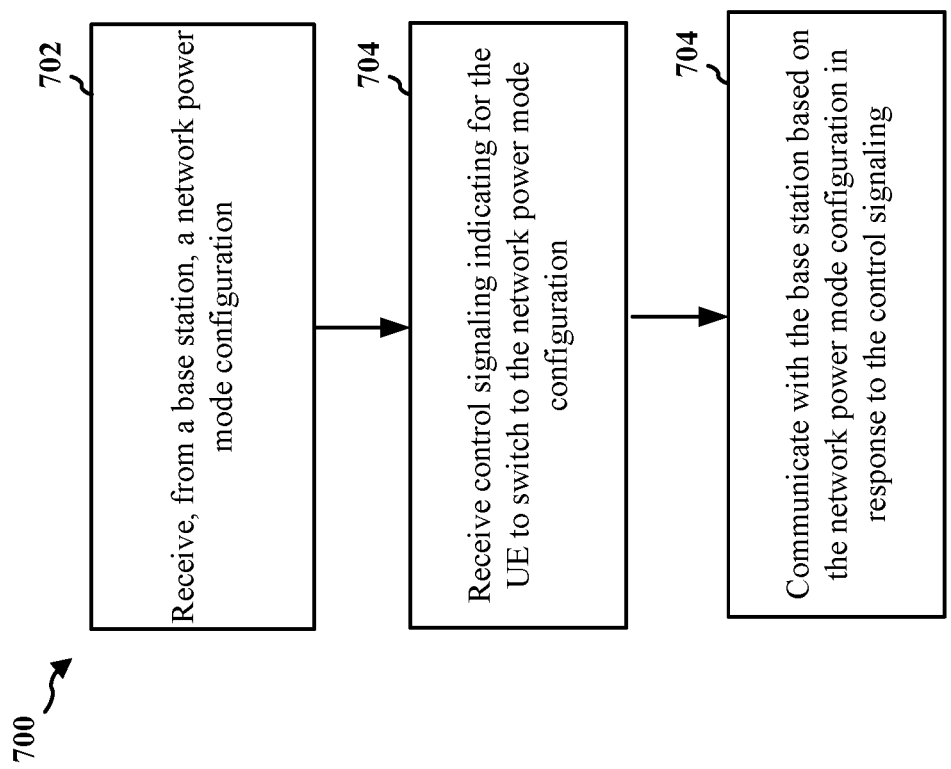
FIG. 7 is a flowchart of a method of wireless communication at a UE, in accordance with various aspects of the present disclosure.

FIG. 7 is a flowchart 700 of a method of wireless communication. The method may be performed by a UE (e.g., the UE 104, 350, 402; the apparatus 802). The method may enable the UE to adjust communication with a base station that switches between different network power modes based on configuration information and/or time pattern information. The configuration and dynamic indications may enable the UE to adjust between the different operations with reduced signaling overhead from the base station as changes in network power modes occur, and may enable the UE to make the adjustments in a more quickly.

At 702, the UE receives, from a base station, a network power mode configuration. FIG. 4 illustrates an example of a UE 402 receiving network power mode configuration information from a base station 404. The multiple network power mode configurations may be comprised in RRC signaling to the UE. Each of the multiple network power mode configurations may include one or more of: a number of active component carriers, a number of transmission or reception antennas, a number of layers, or a number of inactive symbols in a slot. Various example aspects of a network power mode configuration are described in connection with Tables 1-5 in the present application. The reception of the network power mode configurations may be performed, e.g., by the network power mode configuration reception component 840 of the apparatus 802 in FIG. 8.

At 704, the UE receives control signaling indicating for the UE to switch to the network power mode configuration. The reception may be performed, e.g., by the control signaling component 842 of the apparatus 802 in FIG. 8. The DCI may correspond to a GC-DCI. The GC-DCI may include a RNTI associated with switching between network power modes. In some aspects, the control signaling indicating the switch may include one or more of a DCI, a MAC-CE, or an RRC configuration. As an example, the control signaling (e.g., a DCI) may schedule a PDSCH and indicates for the UE to switch to the network power mode configuration during a period of time based on the PDSCH scheduled by the control signaling. The network power mode configuration is a first network power mode configuration, and the UE may receive, in RRC signaling, multiple network power mode configurations including the first network power mode configuration, the control signaling indicating for the UE to switch to the first network power mode configuration from the multiple network power mode configurations.

At 706, the UE communicates with the base station based on the network power mode configuration in response to the control signaling. FIG. 4 illustrates examples of communication 410 and 422 based on different network power modes. For example, the UE may transmit or receive communication with the base station differently based on the current network power mode of the base station. The communication may be performed, e.g., by the transmission component 834, the reception component 830, and/or the communication manager 832 of the apparatus 802 in FIG. 8.

In some aspects, the UE may receive a configuration of a time period between reception of the control signaling and the communicating with the base station based on the network power mode configuration indicated in the control signaling.

In some aspects, the UE may receive a configuration of multiple time periods between reception of the control signaling and the communicating with the base station based on the network power mode configuration, and receive an indication of one of the multiple time periods in the control signaling. The time for the switch may be determine or applied, e.g., by the switch component 844 of the apparatus 802 in FIG. 8.

In some aspects, the UE may receive an indication of a time period in the control signaling, the time period extending between reception of the control signaling and the communicating with the base station based on the network power mode configuration indicated in the control signaling. The control signaling may indicate a number of symbols, slots, frames, or milliseconds for the time period. The time for the switch may be determine or applied, e.g., by the switch component 844 of the apparatus 802 in FIG. 8.

In some aspects, the UE may receive a first indication of a time between reception of the control signaling and a time gap associated with a switch between network power mode configurations. In some aspects, the UE may receive a second indication of a length of the time gap associated with the switch between the network power mode configurations. The UE may communicate with the base station based on a current network power mode configuration during the time between the reception of the control signaling and the time gap. The UE may communicate with the base station based on a switching gap configuration during the time gap associated with the switch between the network power mode configurations. The UE may communicate with the base station based on the switching gap configuration between the reception of the control signaling and the time gap based on an absence of downlink or uplink scheduling for the UE. In some aspects, the UE may receive the switching gap configuration in radio resource control (RRC) signaling, the switching gap configuration indicating one or more UE behaviors for the UE to apply during the time gap associated with the switch between the network power mode configurations.

In some aspects, the UE may receive an indication of a time between reception of the control signaling and a switch to the network power mode configuration. The time for the switch may be determine or applied, e.g., by the switch component 844 of the apparatus 802 in FIG. 8.

In some aspects, the UE may receive a condition for switching between network power mode configurations, the communicating with the base station based on the network power mode configuration indicated in the control signaling being based on the condition being met.

In some aspects, the UE may receive a set of conditions for switching between network power mode configurations, the control signaling indicating at least one of the set of conditions to be met in order to switch to the network power mode configuration indicated in the control signaling.

Figure 8:
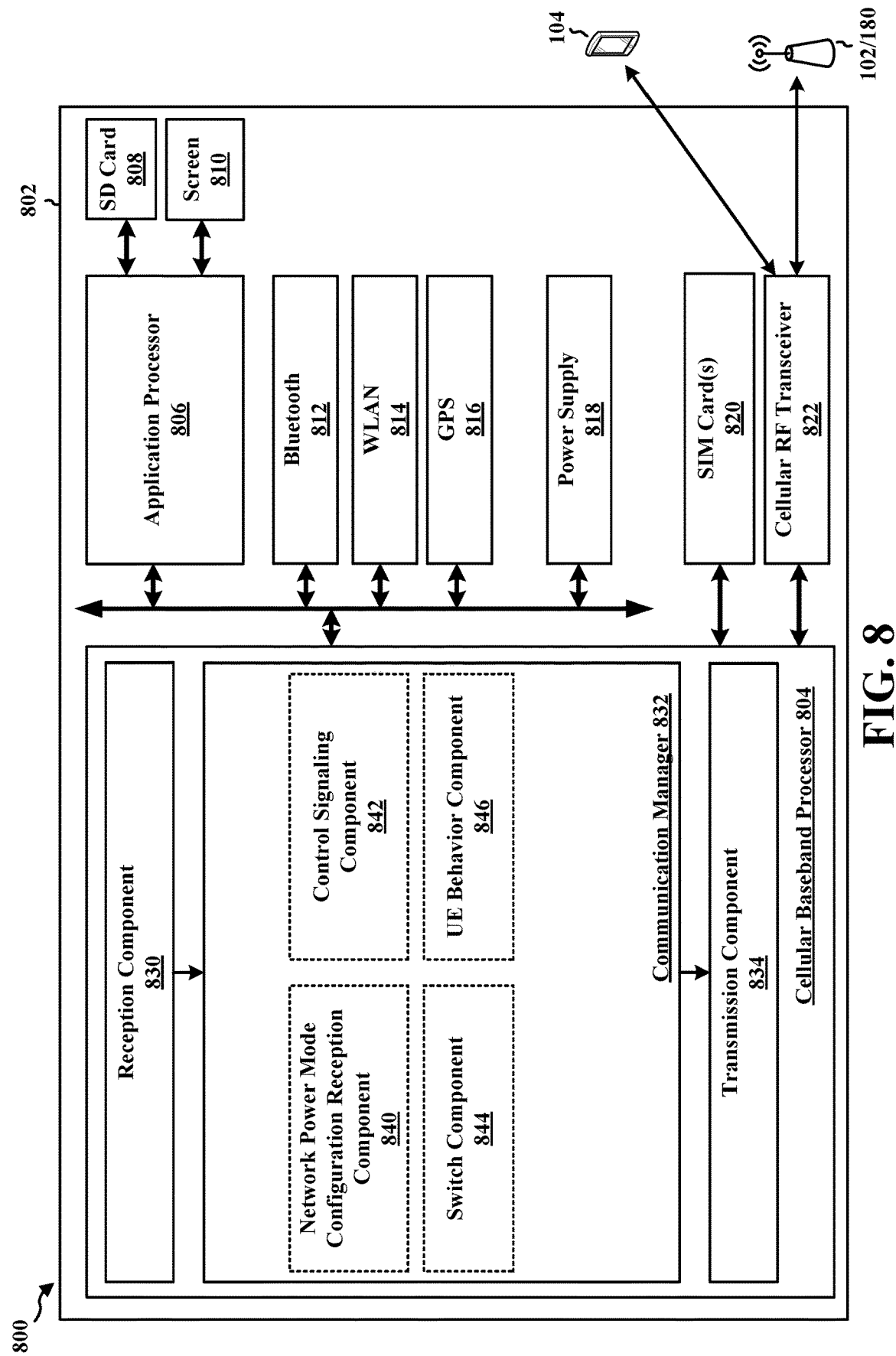
FIG. 8 is a diagram illustrating an example of a hardware implementation for an example apparatus, in accordance with various aspects of the present disclosure.

FIG. 8 is a diagram 800 illustrating an example of a hardware implementation for an apparatus 802. The apparatus 802 may be a UE, a component of a UE, or may implement UE functionality. In some aspects, the apparatus 802 may include a cellular baseband processor 804 (also referred to as a modem) coupled to a cellular RF transceiver 822. In some aspects, the apparatus 802 may further include one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, or a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the cellular baseband processor 804, and in another configuration, the apparatus 802 may be the entire UE (e.g., see 350 of FIG. 3) and include the additional modules of the apparatus 802.

The communication manager 832 includes a network power mode configuration reception component 840 that is configured to receive, from a base station, a network power mode configuration, e.g., as described in connection with 702 in FIG. 7. The communication manager 832 further includes a control signaling component 842 that is configured to receive control signaling indicating for the UE to switch to the network power mode configuration, e.g., as described in connection with 704 in FIG. 7. The communication manager 832 further includes a switch component 844 that is configured to switch from communicating with the base station based on the first network power mode configuration to communicating with the base station based on control signaling. The communication manager 832 further includes a UE behavior component 846 that is configured to receive a configuration of one or more UE behavior associated with a switch between the multiple network power mode configurations, e.g., as described in connection with FIG. 4. The communication manager 832 may be configured to communicate with the base station based on the network power mode configuration in response to the control signaling, e.g., as described in connection with 706 in FIG. 7.

The apparatus may include additional components that perform each of the blocks of the algorithm in the flowcharts of FIG. 7 and/or the aspects performed by the UE in FIG. 4. As such, each block in the flowcharts of FIG. 7 and/or the aspects performed by the UE in FIG. 4 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 802 may include a variety of components configured for various functions. In one configuration, the apparatus 802, and in particular the cellular baseband processor 804, includes means for receiving, from a base station, a network power mode configuration; means for receiving control signaling indicating for the UE to switch to the network power mode configuration; and means for communicating with the base station based on the network power mode configuration in response to the control signaling. The apparatus 802 may further include means for receiving, in RRC signaling, multiple network power mode configurations including the first network power mode configuration, the control signaling indicating for the UE to switch to the first network power mode configuration from the multiple network power mode configurations. The apparatus 802 may further include means for receiving a configuration of a time period between reception of the control signaling and the communicating with the base station based on the network power mode configuration indicated in the control signaling. The apparatus 802 may further include means for receiving a configuration of multiple time periods between reception of the control signaling and the communicating with the base station based on the network power mode configuration, and for receiving an indication of one of the multiple time periods in the control signaling. The apparatus 802 may further include means for receiving an indication of a time period in the control signaling, the time period extending between reception of the control signaling and the communicating with the base station based on the network power mode configuration indicated in the control signaling. The apparatus 802 may further include means for receiving a first indication of a time between reception of the control signaling and a time gap associated with a switch between network power mode configurations. The apparatus 802 may further include means for receiving a second indication of a length of the time gap associated with the switch between the network power mode configurations. The apparatus 802 may further include means for communicating with the base station based on a current network power mode configuration during the time between the reception of the control signaling and the time gap. The apparatus 802 may further include means for communicating with the base station based on a switching gap configuration during the time gap associated with the switch between the network power mode configurations. The apparatus 802 may further include means for communicating with the base station based on the switching gap configuration between the reception of the control signaling and the time gap based on an absence of downlink or uplink scheduling for the UE. The apparatus 802 may further include means for receiving the switching gap configuration in radio resource control (RRC) signaling, the switching gap configuration indicating one or more UE behaviors for the UE to apply during the time gap associated with the switch between the network power mode configurations. The apparatus 802 may further include means for receiving an indication of a time between reception of the control signaling and a switch to the network power mode configuration. The apparatus 802 may further include means for receiving a condition for switching between network power mode configurations, the communicating with the base station based on the network power mode configuration indicated in the control signaling being based on the condition being met. The apparatus 802 may further include means for receiving a set of conditions for switching between network power mode configurations, the control signaling indicating at least one of the set of conditions to be met in order to switch to the network power mode configuration indicated in the control signaling. The means may be one or more of the components of the apparatus 802 configured to perform the functions recited by the means. As described supra, the apparatus 802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 9:
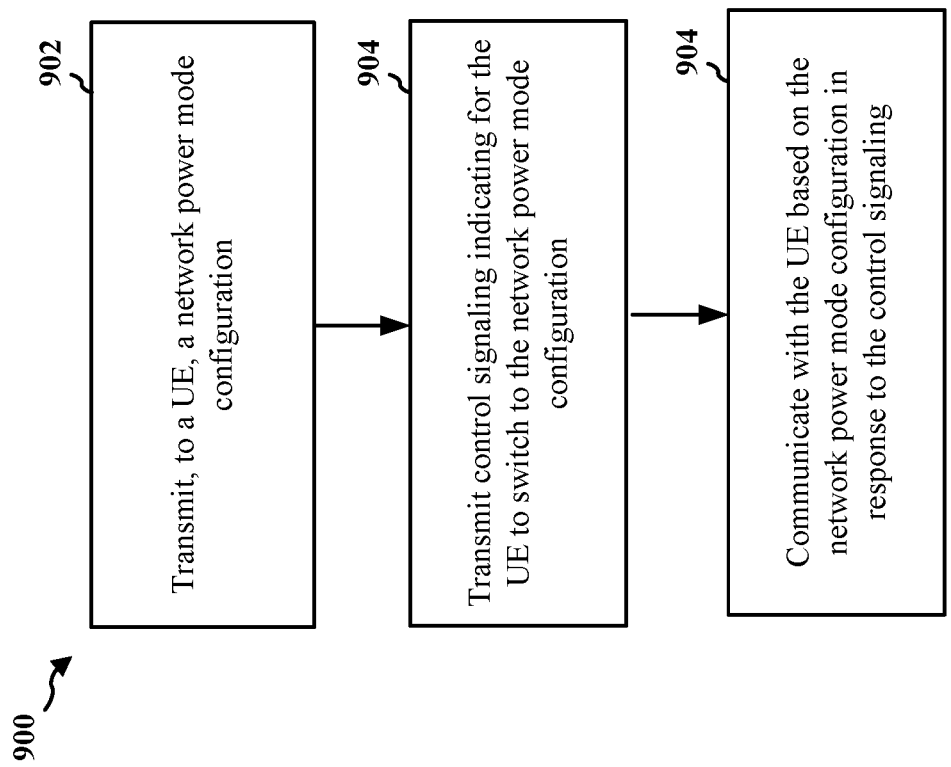
FIG. 9 is a flowchart of a method of wireless communication at a base station, in accordance with various aspects of the present disclosure.

FIG. 9 is a flowchart 900 of a method of wireless communication. The method may be performed by a base station (e.g., the base station 102/180, 310, 404; the apparatus 1002. The method may improve communication between a UE and a base station as the base station switches between different network power modes.

At 902, the base station transmits to a UE, a network power mode configuration. FIG. 4 illustrates an example of a base station 404 transmitting network power mode configuration information. The multiple network power mode configurations may be comprised in RRC signaling to the UE. Each of the multiple network power mode configurations may include one or more of: a number of active component carriers, a number of transmission or reception antennas, a number of layers, or a number of inactive symbols in a slot. Various example aspects of a network power mode configuration are described in connection with Tables 1-5 in the present application.

Figure 10:
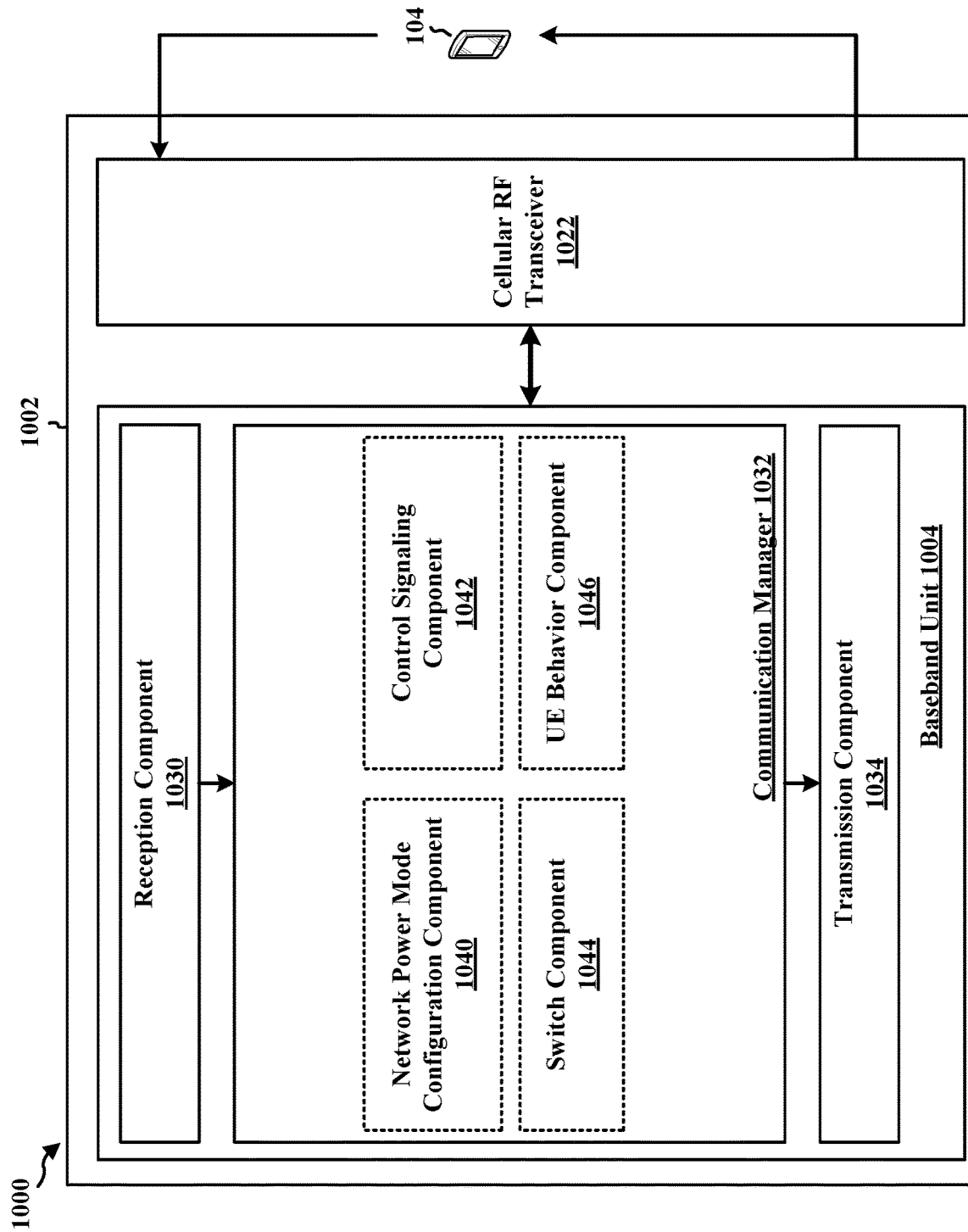
FIG. 10 is a diagram illustrating an example of a hardware implementation for an example apparatus, in accordance with various aspects of the present disclosure.

The reception of the network power mode configurations may be performed, e.g., by the network power mode configuration reception component 1040 of the apparatus 1002 in FIG. 10.

At 904, the base station transmits control signaling indicating for the UE to switch to the network power mode configuration. The transmission may be performed, e.g., by the control signaling component 1042 of the apparatus 1002 in FIG. 10. The control signaling may correspond to a GC-DCI. The GC-DCI may include a RNTI associated with switching between network power modes. In some aspects, the control signaling that indicates for the UE to switch the network power mode configuration may include one or more of a DCI, a MAC-CE, or an RRC configuration. The control signaling (e.g., DCI) may schedule a PDSCH and indicates for the UE to switch to the network power mode configuration during a period of time based on the PDSCH scheduled by the control signaling. The network power mode configuration is a first network power mode configuration, and the base station may transmit, in RRC signaling, multiple network power mode configurations including the first network power mode configuration, the control signaling indicating for the UE to switch to the first network power mode configuration from the multiple network power mode configurations.

At 906, the base station communicates with the UE based on the network power mode configuration in response to the control signaling. FIG. 4 illustrates examples of communication 410 and 422 based on different network power modes. For example, the base station may transmit or receive communication with the base station differently based on the current network power mode of the base station. The communication may be performed, e.g., by the transmission component 1034, the reception component 1030, and/or the communication manager 1032 of the apparatus 1002 in FIG. 10.

In some aspects, the base station may transmit a configuration of a time period between reception of the control signaling and the communicating with the UE based on the network power mode configuration indicated in the control signaling.

In some aspects, the base station may transmit a configuration of multiple time periods between reception of the control signaling and the communicating with the UE based on the network power mode configuration, and receive an indication of one of the multiple time periods in the control signaling.

In some aspects, the base station may transmit an indication of a time period in the control signaling, the time period extending between reception of the control signaling and the communicating with the UE based on the network power mode configuration indicated in the control signaling. The control signaling may indicate a number of symbols, slots, frames, or milliseconds for the time period.

In some aspects, the base station may transmit a first indication of a time between the control signaling and a time gap associated with a switch between network power mode configurations. In some aspects, the base station may transmit a second indication of a length of the time gap associated with the switch between the network power mode configurations. The base station may communicate with the UE based on a current network power mode configuration during the time between the control signaling and the time gap. The base station may communicate with the UE based on a switching gap configuration during the time gap associated with the switch between the network power mode configurations. The base station may communicate with the UE based on the switching gap configuration between the control signaling and the time gap based on an absence of downlink or uplink scheduling for the UE. In some aspects, the base station may transmit the switching gap configuration in radio resource control (RRC) signaling, the switching gap configuration indicating one or more UE behaviors for the UE to apply during the time gap associated with the switch between the network power mode configurations.

In some aspects, the base station may transmit an indication of a time between reception of the control signaling and a switch to the network power mode configuration.

In some aspects, the base station may transmit a condition for switching between network power mode configurations, the communicating with the UE based on the network power mode configuration indicated in the control signaling being based on the condition being met.

In some aspects, the base station may transmit a set of conditions for switching between network power mode configurations, the control signaling indicating at least one of the set of conditions to be met in order to switch to the network power mode configuration indicated in the control signaling.

FIG. 10 is a diagram 1000 illustrating an example of a hardware implementation for an apparatus 1002. The apparatus 1002 may be a base station, a component of a base station, or may implement base station functionality. In some aspects, the apparatus 802 may include a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes a network power mode configuration reception component 1040 that is configured to transmit to a UE, a network power mode configuration, e.g., as described in connection with 902 in FIG. 9. The communication manager 1032 further includes a control signaling component 1042 that is configured to transmit control signaling indicating for the UE to switch to the network power mode configuration, e.g., as described in connection with 904 in FIG. 9. The communication manager 1032 further includes a switch component 1044 that is configured to switch from communicating with the UE based on the first network power mode configuration to communicating with the UE based on the second power mode indicated in the control signaling. The communication manager 1032 further includes a UE behavior component 1046 that is configured to transmit a configuration of one or more UE behaviors associated with a switch between the multiple network power mode configurations, e.g., as described in connection with FIG. 4. The communication manager 1032 may be configured to communicate with the UE based on the network power mode configuration in response to the control signaling, e.g., as described in connection with 906 in FIG. 9.

The apparatus may include additional components that perform each of the blocks of the algorithm in the flowcharts of FIG. 9 and/or the aspects performed by the base station in FIG. 4. As such, each block in the flowchart of FIG. 9 and/or the aspects performed by the base station in FIG. 4 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the baseband unit 1004, includes means for transmitting to a UE, a network power mode configuration; means for transmitting control signaling indicating for the UE to switch to the network power mode configuration; and means for communicating with the UE based on the network power mode configuration in response to the control signaling. The apparatus 1002 may further include means for transmitting, in RRC signaling, multiple network power mode configurations including the first network power mode configuration, the control signaling indicating for the UE to switch to the first network power mode configuration from the multiple network power mode configurations. The apparatus 1002 may further include means for transmitting a configuration of a time period between re the control signaling and the communicating with the UE based on the network power mode configuration indicated in the control signaling. The apparatus 1002 may further include means for transmitting a configuration of multiple time periods between reception of the control signaling and the communicating with the UE based on the network power mode configuration, and transmitting an indication of one of the multiple time periods in the control signaling. The apparatus 1002 may further include means for transmitting an indication of a time period in the control signaling, the time period extending between the control signaling and the communicating with UE based on the network power mode configuration indicated in the control signaling. The apparatus 1002 may further include means for transmitting a first indication of a time between reception of the control signaling and a time gap associated with a switch between network power mode configurations. The apparatus 1002 may further include means for transmitting a second indication of a length of the time gap associated with the switch between the network power mode configurations. The apparatus 1002 may further include means for communicating with the UE based on a current network power mode configuration during the time between the control signaling and the time gap. The apparatus 1002 may further include means for communicating with the UE based on a switching gap configuration during the time gap associated with the switch between the network power mode configurations. The apparatus 1002 may further include means for communicating with the UE based on the switching gap configuration between the control signaling and the time gap based on an absence of downlink or uplink scheduling for the UE. The apparatus 1002 may further include means for transmitting the switching gap configuration in RRC signaling, the switching gap configuration indicating one or more UE behaviors for the UE to apply during the time gap associated with the switch between the network power mode configurations. The apparatus 1002 may further include means for transmitting an indication of a time between the control signaling and a switch to the network power mode configuration. The apparatus 1002 may further include means for transmitting a condition for switching between network power mode configurations, the communicating with the UE based on the network power mode configuration indicated in the control signaling being based on the condition being met. The apparatus 1002 may further include means for transmitting a set of conditions for switching between network power mode configurations, the control signaling indicating at least one of the set of conditions to be met in order to switch to the network power mode configuration indicated in the control signaling. The means may be one or more of the components of the apparatus 1002 configured to perform the functions recited by the means. As described supra, the apparatus 1002 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a user equipment (UE), comprising: receiving, from a base station, a network power mode configuration; receiving control signaling indicating for the UE to switch to the network power mode configuration; and communicating with the base station based on the network power mode configuration in response to the control signaling.

In aspect 2, the method of aspect 1 further includes that the control signaling corresponds to a group common DCI (GC-DCI).

In aspect 3, the method of aspect 2 further includes that the GC-DCI includes a radio network temporary identifier (RNTI) associated with switching between network power modes.

In aspect 4, the method of any of aspects 1-3 further includes that the control signaling schedules a physical downlink shared channel (PDSCH) and indicates for the UE to switch to the network power mode configuration during a period of time based on the PDSCH scheduled by the control signaling.

In aspect 5, the method of any of aspects 1-4 further includes that the network power mode configuration is a first network power mode configuration, the method further comprising: receiving, in radio resource control (RRC) signaling, multiple network power mode configurations including the first network power mode configuration, the control signaling indicating for the UE to switch to the first network power mode configuration from the multiple network power mode configurations.

In aspect 6, the method of any of aspects 1-5 further includes receiving a configuration of a time period between reception of the control signaling and the communicating with the base station based on the network power mode configuration indicated in the control signaling.

In aspect 7, the method of any of aspects 1-6 further includes receiving a configuration of multiple time periods between reception of the control signaling and the communicating with the base station based on the network power mode configuration, and receiving an indication of one of the multiple time periods in the control signaling.

In aspect 8, the method of any of aspects 1-5 further includes receiving an indication of a time period in the control signaling, the time period extending between reception of the control signaling and the communicating with the base station based on the network power mode configuration indicated in the control signaling.

In aspect 9, the method of aspect 8 further includes that the control signaling indicates a number of symbols for the time period.

In aspect 10, the method of aspect 8 further includes that the control signaling indicates a number of slots for the time period.

In aspect 11, the method of aspect 8 further includes that the control signaling indicates a number of frames for the time period.

In aspect 12, the method of aspect 8 further includes that the control signaling indicates a number of milliseconds for the time period.

In aspect 13, the method of any of aspects 1-5 further includes receiving a first indication of a time between reception of the control signaling and a time gap associated with a switch between network power mode configurations.

In aspect 14, the method of aspect 13 further includes receiving a second indication of a length of the time gap associated with the switch between the network power mode configurations.

In aspect 15, the method of aspect 13 or aspect 14 further includes communicating with the base station based on a current network power mode configuration during the time between the reception of the control signaling and the time gap.

In aspect 16, the method of aspect 13 or aspect 14 further includes communicating with the base station based on a switching gap configuration during the time gap associated with the switch between the network power mode configurations.

In aspect 17, the method of aspect 16 further includes communicating with the base station based on the switching gap configuration between the reception of the control signaling and the time gap based on an absence of downlink or uplink scheduling for the UE.

In aspect 18, the method of aspect 16 further includes receiving the switching gap configuration in RRC signaling, the switching gap configuration indicating one or more UE behaviors for the UE to apply during the time gap associated with the switch between the network power mode configurations.

In aspect 19, the method of any of aspects 1-5 further includes receiving an indication of a time between reception of the control signaling and a switch to the network power mode configuration.

In aspect 20, the method of any of aspects 1-19 further includes receiving a condition for switching between network power mode configurations, the communicating with the base station based on the network power mode configuration indicated in the control signaling being based on the condition being met.

In aspect 21, the method of any of aspects 1-19 further includes receiving a set of conditions for switching between network power mode configurations, the control signaling indicating at least one of the set of conditions to be met in order to switch to the network power mode configuration indicated in the control signaling.

Aspect 22 is an apparatus for wireless communication including at least one processor coupled to a memory, the at least one processor configured to perform the method of any of aspects 1-21.

In aspect 23, the apparatus of aspect 22 further includes at least one of an antenna or a transceiver coupled to the at least one processor.

Aspect 24 is an apparatus for wireless communication including means for performing the method of any of aspects 1-21.

In aspect 25, the apparatus of aspect 24 further includes at least one of an antenna or a transceiver.

Aspect 26 is a non-transitory computer-readable medium storing computer executable code, where the code when executed by a processor causes the processor to implement any of aspects 1-21.

Aspect 27 is a method of wireless communication at a base station, comprising: transmitting, to a UE, a network power mode configuration; transmitting control signaling indicating for the UE to switch to the network power mode configuration; and communicating with the UE based on the network power mode configuration in response to the control signaling.

In aspect 28, the method of aspect 27 further includes that the control signaling corresponds to a group common DCI (GC-DCI).

In aspect 29, the method of aspect 28 further includes that the GC-DCI includes a radio network temporary identifier (RNTI) associated with switching between network power modes.

In aspect 30, the method of any of aspects 27-29 further includes that the control signaling schedules a physical downlink shared channel (PDSCH) and indicates for the UE to switch to the network power mode configuration during a period of time based on the PDSCH scheduled by the control signaling.

In aspect 31, the method of any of aspects 27-30 further includes that the network power mode configuration is a first network power mode configuration, the method further comprising: transmitting, in radio resource control (RRC) signaling, multiple network power mode configurations including the first network power mode configuration, the control signaling indicating for the UE to switch to the first network power mode configuration from the multiple network power mode configurations.

In aspect 32, the method of any of aspects 27-31 further includes transmitting a configuration of a time period between the control signaling and the communicating with the UE based on the network power mode configuration indicated in the control signaling.

In aspect 33, the method of any of aspects 27-31 further includes transmitting a configuration of multiple time periods between reception of the control signaling and the communicating with the UE based on the network power mode configuration, and transmitting an indication of one of the multiple time periods in the control signaling.

In aspect 34, the method of any of aspects 27-31 further includes transmitting an indication of a time period in the control signaling, the time period extending between the control signaling and the communicating with UE based on the network power mode configuration indicated in the control signaling.

In aspect 35, the method of aspect 34 further includes that the control signaling indicates a number of symbols for the time period.

In aspect 36, the method of aspect 34 further includes that the control signaling indicates a number of slots for the time period.

In aspect 37, the method of aspect 34 further includes that the control signaling indicates a number of frames for the time period.

In aspect 38, the method of aspect 34 further includes that the control signaling indicates a number of milliseconds for the time period.

In aspect 39, the method of any of aspects 27-31 further includes transmitting a first indication of a time between reception of the control signaling and a time gap associated with a switch between network power mode configurations.

In aspect 40, the method of aspect 39 further includes transmitting a second indication of a length of the time gap associated with the switch between the network power mode configurations.

In aspect 41, the method of aspect 40 further includes communicating with the UE based on a current network power mode configuration during the time between the control signaling and the time gap.

In aspect 42, the method of aspect 39 further includes communicating with the UE based on a switching gap configuration during the time gap associated with the switch between the network power mode configurations.

In aspect 43, the method of aspect 42 further includes communicating with the UE based on the switching gap configuration between the control signaling and the time gap based on an absence of downlink or uplink scheduling for the UE.

In aspect 44, the method of aspect 42 further includes transmitting the switching gap configuration in radio resource control (RRC) signaling, the switching gap configuration indicating one or more UE behaviors for the UE to apply during the time gap associated with the switch between the network power mode configurations.

In aspect 45, the method of any of aspects 27-31 further includes transmitting an indication of a time between the control signaling and a switch to the network power mode configuration.

In aspect 46, the method of any of aspects 27-45 further includes transmitting a condition for switching between network power mode configurations, the communicating with the UE based on the network power mode configuration indicated in the control signaling being based on the condition being met.

In aspect 47, the method of any of aspects 27-45 further includes transmitting a set of conditions for switching between network power mode configurations, the control signaling indicating at least one of the set of conditions to be met in order to switch to the network power mode configuration indicated in the control signaling.

Aspect 48 is an apparatus for wireless communication including at least one processor coupled to a memory, the at least one processor configured to perform the method of any of aspects 27-47.

In aspect 49, the apparatus of aspect 48 further includes at least one of an antenna or a transceiver coupled to the at least one processor.

Aspect 50 is an apparatus for wireless communication including means for performing the method of any of aspects 27-47.

In aspect 51, the apparatus of aspect 50 further includes at least one of an antenna or a transceiver.

Aspect 52 is a non-transitory computer-readable medium storing computer executable code, where the code when executed by a processor causes the processor to implement any of aspects 27-47.

What is claimed is:

1. An apparatus for wireless communication at a user equipment (UE), comprising:
 memory; and
 at least one processor coupled to the memory, the at least one processor configured to cause the UE to:
  receive, from a base station, a network power mode configuration corresponding to a mode of operation of the base station that affects a power consumption of the base station;
  receive control signaling indicating for the UE to switch to the network power mode configuration associated with the mode of operation of the base station; and
  communicate with the base station based on the network power mode configuration in response to the control signaling.

2. The apparatus of claim 1, wherein the control signaling corresponds to a group common DCI (GC-DCI).

3. The apparatus of claim 2, wherein the GC-DCI includes a radio network temporary identifier (RNTI) associated with switching between network power modes.

4. The apparatus of claim 1, wherein the control signaling schedules a physical downlink shared channel (PDSCH) and indicates for the UE to switch to the network power mode configuration during a period of time based on the PDSCH scheduled by the control signaling.

5. The apparatus of claim 1, wherein the network power mode configuration is a first network power mode configuration, the at least one processor being further configured to cause the UE to:
receive, in radio resource control (RRC) signaling, multiple network power mode configurations including the first network power mode configuration, the control signaling indicating for the UE to switch to the first network power mode configuration from the multiple network power mode configurations.

6. The apparatus of claim 1, wherein the at least one processor is further configured to cause the UE to:
receive a configuration of a time period between reception of the control signaling and communication with the base station based on the network power mode configuration indicated in the control signaling.

7. The apparatus of claim 1, wherein the at least one processor is further configured to cause the UE to:
receive a configuration of multiple time periods between reception of the control signaling and communication with the base station based on the network power mode configuration, and
receive an indication of one of the multiple time periods in the control signaling.

8. The apparatus of claim 1, wherein the at least one processor is further configured to cause the UE to:
receive an indication of a time period in the control signaling, the time period extending between reception of the control signaling and communication with the base station based on the network power mode configuration indicated in the control signaling.

9. The apparatus of claim 8, wherein the control signaling indicates a number of symbols, slots, frames, or milliseconds for the time period.

10. The apparatus of claim 1, wherein the at least one processor is further configured to cause the UE to:
receive a first indication of a time between reception of the control signaling and a time gap associated with a switch between network power mode configurations.

11. The apparatus of claim 10, wherein the at least one processor is further configured to cause the UE to:
receive a second indication of a length of the time gap associated with the switch between the network power mode configurations.

12. The apparatus of claim 10, wherein the at least one processor is further configured to cause the UE to:
communicate with the base station based on a current network power mode configuration during the time between the reception of the control signaling and the time gap.

13. The apparatus of claim 10, wherein the at least one processor is further configured to cause the UE to:
communicate with the base station based on a switching gap configuration during the time gap associated with the switch between the network power mode configurations.

14. The apparatus of claim 13, wherein the at least one processor is further configured to cause the UE to:
communicate with the base station based on the switching gap configuration between the reception of the control signaling and the time gap based on an absence of downlink or uplink scheduling for the UE.

15. The apparatus of claim 13, wherein the at least one processor is further configured to cause the UE to:
receive the switching gap configuration in radio resource control (RRC) signaling, the switching gap configuration indicating one or more UE behaviors for the UE to apply during the time gap associated with the switch between the network power mode configurations.

16. The apparatus of claim 1, wherein the at least one processor is further configured to cause the UE to:
receive an indication of a time between reception of the control signaling and a switch to the network power mode configuration.

17. The apparatus of claim 1, wherein the at least one processor is further configured to cause the UE to:
receive a condition for switching between network power mode configurations, communication with the base station being based on the network power mode configuration indicated in the control signaling being based on the condition being met.

18. The apparatus of claim 1, wherein the at least one processor is further configured to cause the UE to:
receive a set of conditions for switching between network power mode configurations, the control signaling indicating at least one of the set of conditions to be met in order to switch to the network power mode configuration indicated in the control signaling.

19. A method of wireless communication at a user equipment (UE), comprising:
receiving, from a base station, a network power mode configuration corresponding to a mode of operation of the base station that affects a power consumption of the base station;
receiving control signaling indicating for the UE to switch to the network power mode configuration associated with the mode of operation of the base station; and
communicating with the base station based on the network power mode configuration in response to the control signaling.

20. An apparatus for wireless communication at a base station, comprising:
memory; and
at least one processor coupled to the memory, the at least one processor configured to cause the base station to:
transmit, to a UE, a network power mode configuration corresponding to a mode of operation of the base station that affects a power consumption of the base station;
transmit control signaling indicating for the UE to switch to the network power mode configuration associated with the mode of operation of the base station; and
communicate with the UE based on the network power mode configuration in response to the control signaling.

21. The apparatus of claim 20, wherein the control signaling corresponds to a group common DCI (GC-DCI).

22. The apparatus of claim 20, wherein the control signaling schedules a physical downlink shared channel (PDSCH) and indicates for the UE to switch to the network power mode configuration during a period of time based on the PDSCH scheduled by the control signaling.

23. The apparatus of claim 20, wherein the network power mode configuration is a first network power mode configuration, the at least one processor being further configured to cause the base station to:
transmit, in radio resource control (RRC) signaling, multiple network power mode configurations including the first network power mode configuration, the control signaling indicating for the UE to switch to the first network power mode configuration from the multiple network power mode configurations.

24. The apparatus of claim 20, wherein the at least one processor is further configured to cause the base station to:
transmit a configuration of a time period between the control signaling and communication with the UE based on the network power mode configuration indicated in the control signaling.

25. The apparatus of claim 20, wherein the at least one processor is further configured to cause the base station to:
transmit a configuration of multiple time periods between the control signaling and communication with the UE based on the network power mode configuration, and transmit an indication of one of the multiple time periods in the control signaling.

26. The apparatus of claim 20, wherein the at least one processor is further configured to cause the base station to:
transmit an indication of a time period in the control signaling, the time period extending between the control signaling and communication with the UE based on the network power mode configuration indicated in the control signaling.

27. The apparatus of claim 20, wherein the at least one processor is further configured to cause the base station to:
transmit a first indication of a time between reception of the control signaling and a time gap associated with a switch between network power mode configurations; and
transmit a second indication of a length of the time gap associated with the switch between the network power mode configurations.

28. The apparatus of claim 27, wherein the at least one processor is further configured to cause the base station to perform at least one of:
communicate with the UE based on a current network power mode configuration during the time between the control signaling and the time gap; or
communicate with the UE based on a switching gap configuration during the time gap associated with the switch between the network power mode configurations.

29. The apparatus of claim 20, wherein the at least one processor is further configured to cause the base station to:
transmit a set of conditions for switching between network power mode configurations, the control signaling indicating at least one of the set of conditions to be met in order to switch to the network power mode configuration indicated in the control signaling.

30. A method of wireless communication at a base station, comprising:
transmitting, to a UE, a network power mode configuration corresponding to a mode of operation of the base station that affects a power consumption of the base station;
transmitting control signaling indicating for the UE to switch to the network power mode configuration associated with the mode of operation of the base station; and
communicating with the UE based on the network power mode configuration in response to the control signaling.

* * * * *